(12) United States Patent
Hemingway

(10) Patent No.: US 12,337,669 B2
(45) Date of Patent: Jun. 24, 2025

(54) TRUCK BED ENCLOSURE ASSEMBLY

(71) Applicant: Paul Hemingway, Reidsville, NC (US)

(72) Inventor: Paul Hemingway, Reidsville, NC (US)

(*) Notice: Subject to any disclaimer, the term of this patent is extended or adjusted under 35 U.S.C. 154(b) by 282 days.

(21) Appl. No.: 18/079,379

(22) Filed: Dec. 12, 2022

(65) Prior Publication Data
US 2024/0190224 A1    Jun. 13, 2024

(51) Int. Cl.
*B60J 7/16* (2006.01)
*B60J 7/10* (2006.01)

(52) U.S. Cl.
CPC ............ *B60J 7/1614* (2013.01); *B60J 7/106* (2013.01)

(58) Field of Classification Search
CPC . B60J 7/102; B60J 7/104; B60J 7/1614; B60J 7/041; B60J 7/062; B60J 7/08; B60J 7/141; B60J 7/106; B60J 7/1607; B60J 7/1628; B60J 7/194; B60J 5/14; B60P 3/34; B60P 3/341; B60P 3/42; B60P 3/423; B60P 7/04
USPC ....... 296/26.13, 26.15, 26.04, 26.02, 100.01, 296/100.17, 100.11, 100.13, 100.16, 296/100.15, 210, 102, 213, 219, 136.03, 296/136.04, 136.05, 136.1, 136.06, 140, 296/141, 180.1, 180.4, 181.5, 217, 91
See application file for complete search history.

(56) References Cited

U.S. PATENT DOCUMENTS

| | | | |
|---|---|---|---|
| 4,012,070 A * | 3/1977 | Mertz | B60P 3/32 296/165 |
| 4,603,901 A | 8/1986 | McIntosh | |
| 4,828,315 A * | 5/1989 | Muirhead | B60J 7/106 296/99.1 |
| 5,002,329 A * | 3/1991 | Rafi-Zadeh | B60J 7/1614 248/166 |
| 5,054,377 A * | 10/1991 | Mochel | B60H 1/262 296/217 |
| 6,209,944 B1 | 4/2001 | Billiu | |
| 6,244,651 B1 | 6/2001 | Hecock, Jr. | |
| 6,428,079 B1 * | 8/2002 | Van Dyke | B60J 7/141 296/100.09 |
| 6,467,830 B1 * | 10/2002 | Cortright | B60R 13/06 296/26.05 |
| 6,499,795 B2 * | 12/2002 | Clare | B62D 33/02 296/183.1 |
| 6,679,542 B1 * | 1/2004 | Semotuk | B60P 3/341 296/173 |
| 6,705,666 B2 * | 3/2004 | Lynch | B60J 7/106 296/100.07 |

(Continued)

*Primary Examiner* — Amy R Weisberg
*Assistant Examiner* — Veronica M Condo

(57) ABSTRACT

A truck bed enclosure assembly for securing contents of a truck bed and attached cabinets includes a lift module and a shell. The lift module is mountable to a bed of a truck, wherein the bed comprises a platform and a pair of sidewalls that define a central pathway. The shell is attached to the lift module so that the shell is selectively positionable in an extended configuration and a lowered configuration. In the extended configuration, the pair of sidewalls and the central pathway are accessible to a user. In the lowered configuration, opposed side panels of the shell bracket and at least partially cover the sidewalls of the bed and a rear panel of the shell covers an opening to the central pathway. The shell thus deters access to the sidewalls and to the central pathway.

20 Claims, 8 Drawing Sheets

(56) References Cited

U.S. PATENT DOCUMENTS

| | | | | |
|---|---|---|---|---|
| 6,712,421 B1* | 3/2004 | Wilson | B60P 3/341 | |
| | | | 296/100.06 | |
| 7,052,067 B2* | 5/2006 | Walker | B60R 11/02 | |
| | | | 296/37.6 | |
| 7,226,108 B2* | 6/2007 | Altman | B60J 7/1614 | |
| | | | 296/26.04 | |
| 7,828,356 B2* | 11/2010 | Wood | B60P 3/40 | |
| | | | 296/26.11 | |
| 8,007,024 B2 | 8/2011 | Kealy | | |
| 8,186,739 B2* | 5/2012 | Bruestle | B60J 7/1614 | |
| | | | 296/100.01 | |
| 8,376,437 B2* | 2/2013 | Edens | B60J 7/1614 | |
| | | | 296/26.05 | |
| 8,474,896 B2 | 7/2013 | Ostberg | | |
| 9,139,123 B2* | 9/2015 | Cepynsky | B62D 63/061 | |
| 9,409,525 B2* | 8/2016 | Gillam | B62D 33/023 | |
| 9,481,403 B1* | 11/2016 | Johnson | B62D 33/023 | |
| 10,086,684 B1* | 10/2018 | Stamm, Jr. | B60J 7/1621 | |
| 10,343,586 B2* | 7/2019 | Stoetzl | B60P 3/341 | |
| 10,457,128 B2* | 10/2019 | Sullivan | B60R 9/00 | |
| 10,493,831 B2 | 12/2019 | Singer | | |
| 11,505,048 B2* | 11/2022 | King | B60J 7/1204 | |
| 2004/0007900 A1* | 1/2004 | Block | B60J 7/106 | |
| | | | 296/193.12 | |
| 2004/0036308 A1* | 2/2004 | Sloss | B60P 3/40 | |
| | | | 296/3 | |
| 2005/0093339 A1* | 5/2005 | Klassen | B62D 33/03 | |
| | | | 296/183.1 | |
| 2008/0174142 A1* | 7/2008 | Pearlman | B60J 7/1614 | |
| | | | 296/100.1 | |

* cited by examiner

TRUCK BED ENCLOSURE ASSEMBLY

CROSS-REFERENCE TO RELATED APPLICATIONS

Statement Regarding Federally Sponsored Research or Development

Not Applicable

The Names of the Parties to a Joint Research Agreement

Not Applicable

Incorporation-by-Reference of Material Submitted on a Compact Disc or as a Text File Via the Office Electronic Filing System Not Applicable Statement Regarding Prior Disclosures by the Inventor or Joint Inventor Not Applicable

BACKGROUND OF THE INVENTION

(1) Field of the Invention

The disclosure relates to truck bed enclosures and more particularly pertains to a new truck bed enclosure for securing contents of a truck bed and attached cabinets. The present invention discloses a truck bed enclosure that covers exterior facing cabinet doors attached to a bed of a truck, as well as an opening to a pathway between the cabinets, thereby securing items positioned in the cabinets and in the bed of the truck.

(2) Description of Related Art Including Information Disclosed Under 37 CFR 1.97 and 1.98

The prior art relates to truck bed enclosures, which may comprise liftable tops for pickup trucks, which cover tops of beds of the pickup trucks, but which do not extend over and bracket sidewalls of the beds and thus do not secure cabinet doors positioned in the sidewalls.

BRIEF SUMMARY OF THE INVENTION

An embodiment of the disclosure meets the needs presented above by generally comprising a lift module and a shell. The lift module is configured to be mountable to a bed of a truck, wherein the bed comprises a platform and a pair of sidewalls that define a central pathway. The shell is attached to the lift module so that the shell is selectively positionable in an extended configuration and a lowered configuration. In the extended configuration, the pair of sidewalls and the central pathway are accessible to a user. In the lowered configuration, opposed side panels of the shell bracket and at least partially cover the sidewalls of the bed and a rear panel of the shell covers an opening to the central pathway. The shell thus is configured to deter access to the sidewalls and to the central pathway.

Another embodiment of the disclosure includes a truck bed enclosure system, which comprises a truck and a truck bed enclosure assembly, as described above.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
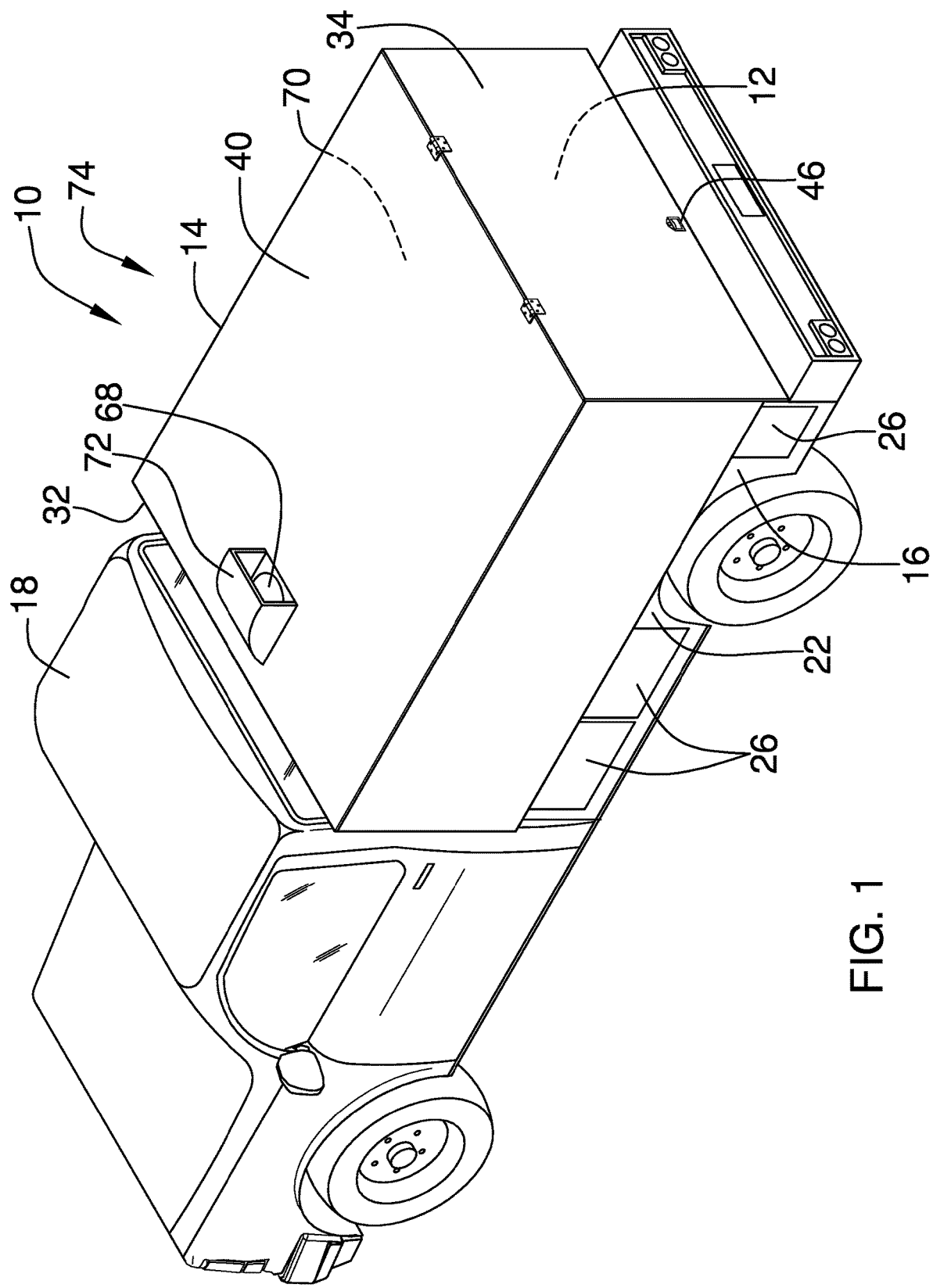
FIG. 1 is an isometric perspective, lowered view of a truck bed enclosure assembly according to an embodiment of the disclosure.

With reference now to the drawings, and in particular to FIGS. 1 through 8 thereof, a new truck bed enclosure embodying the principles and concepts of an embodiment of the disclosure and generally designated by the reference numeral 10 will be described.

Figure 2:
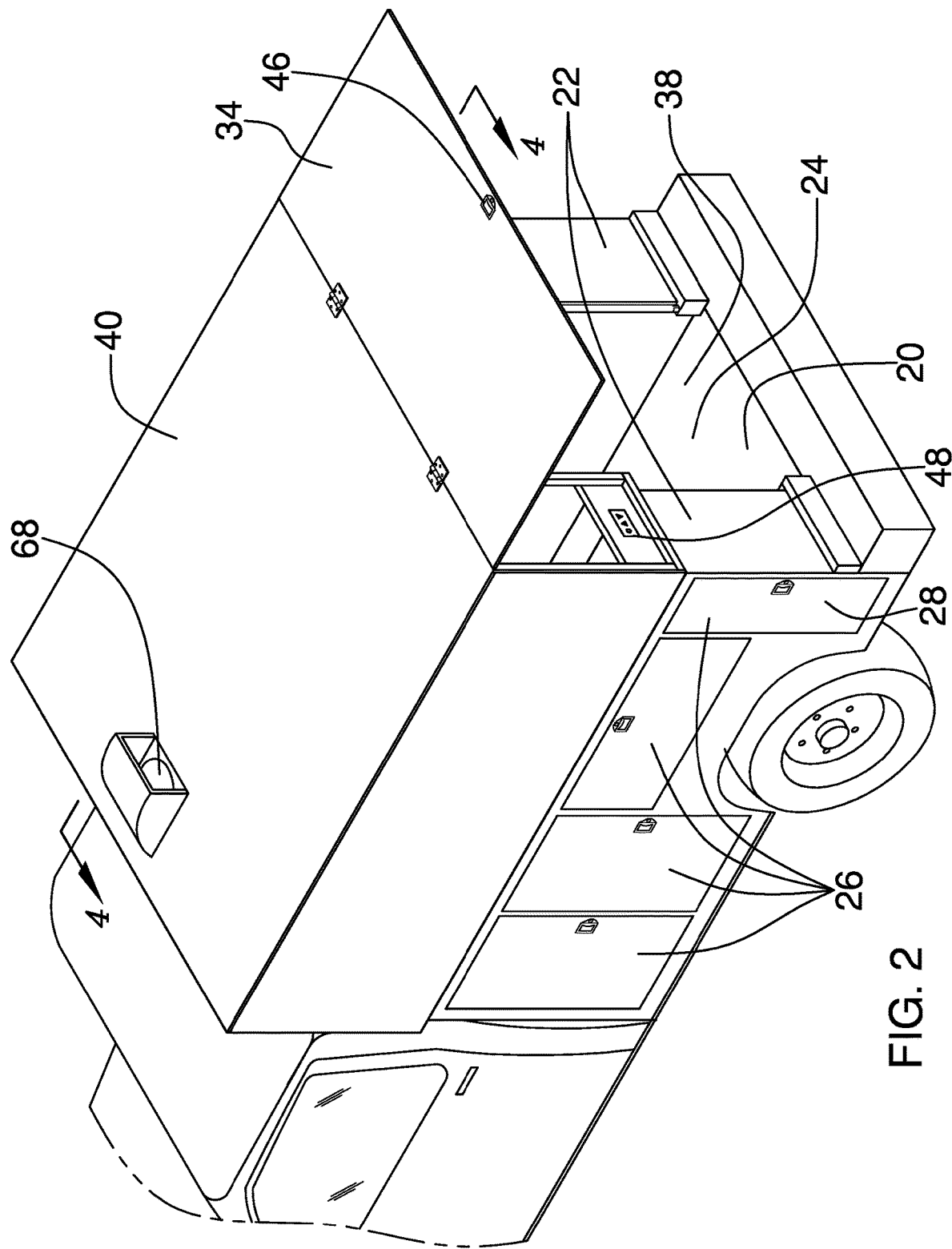
FIG. 2 is an isometric perspective, extended view of an embodiment of the disclosure.
Figure 3:
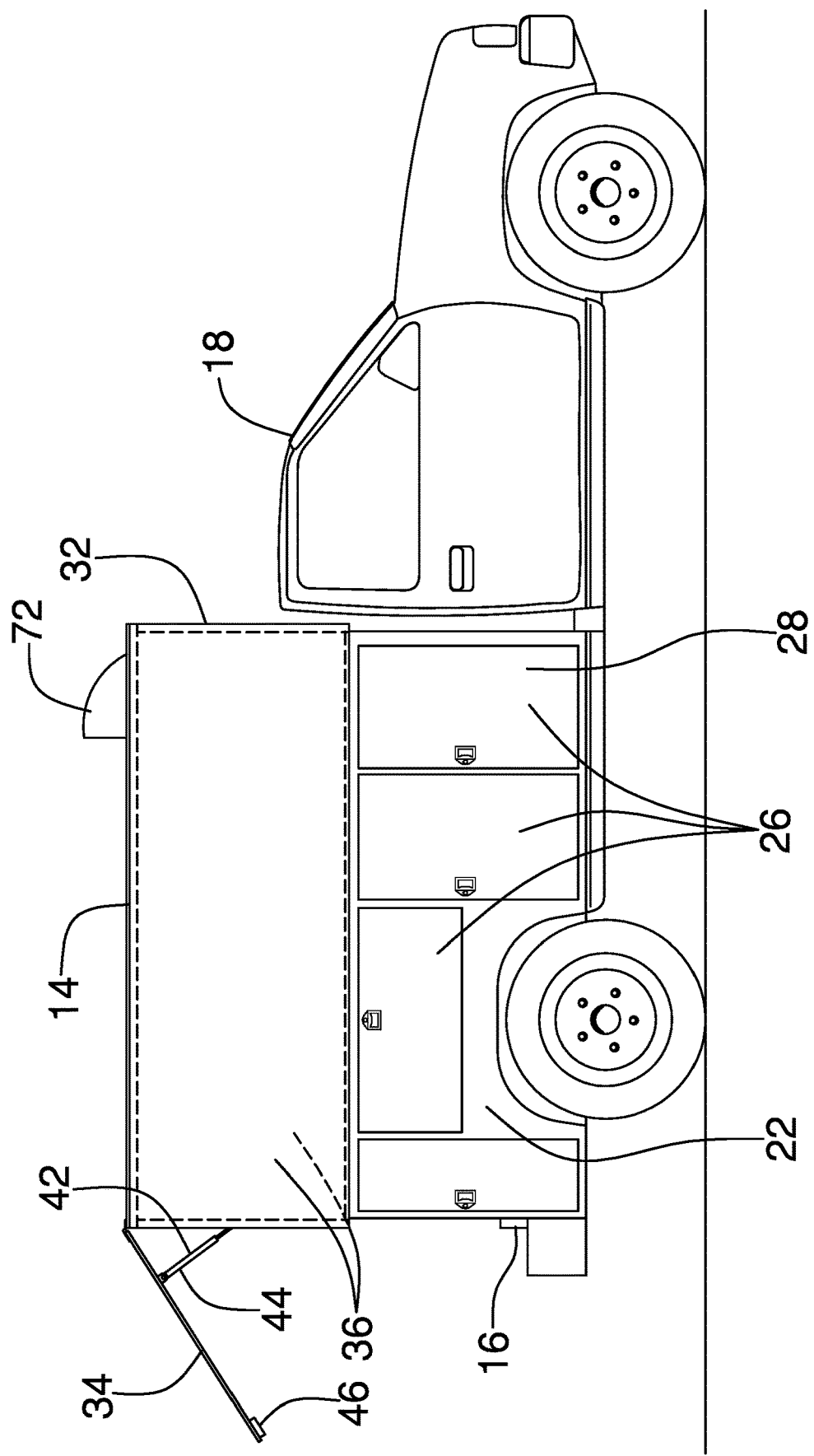
FIG. 3 is a side view of an embodiment of the disclosure.

As best illustrated in FIGS. 1 through 8, the truck bed enclosure assembly 10 generally comprises a lift module 12 and a shell 14. The lift module 12 is configured to be mountable to a bed 16 of a truck 18. The bed 16 of the truck 18 comprises a platform 20 and a pair of sidewalls 22, which define a central pathway 24. The present invention is anticipated to be most useful when one or both of the sidewalls 22 comprise a plurality of cabinets 26. As shown in FIGS. 2 and 3, each sidewall 22 comprises a plurality of cabinets 26. Each cabinet 26 has a door 28 that allows access to the cabinet 26 by a user who is standing next to the bed 16 of the truck 18.

Figure 4:
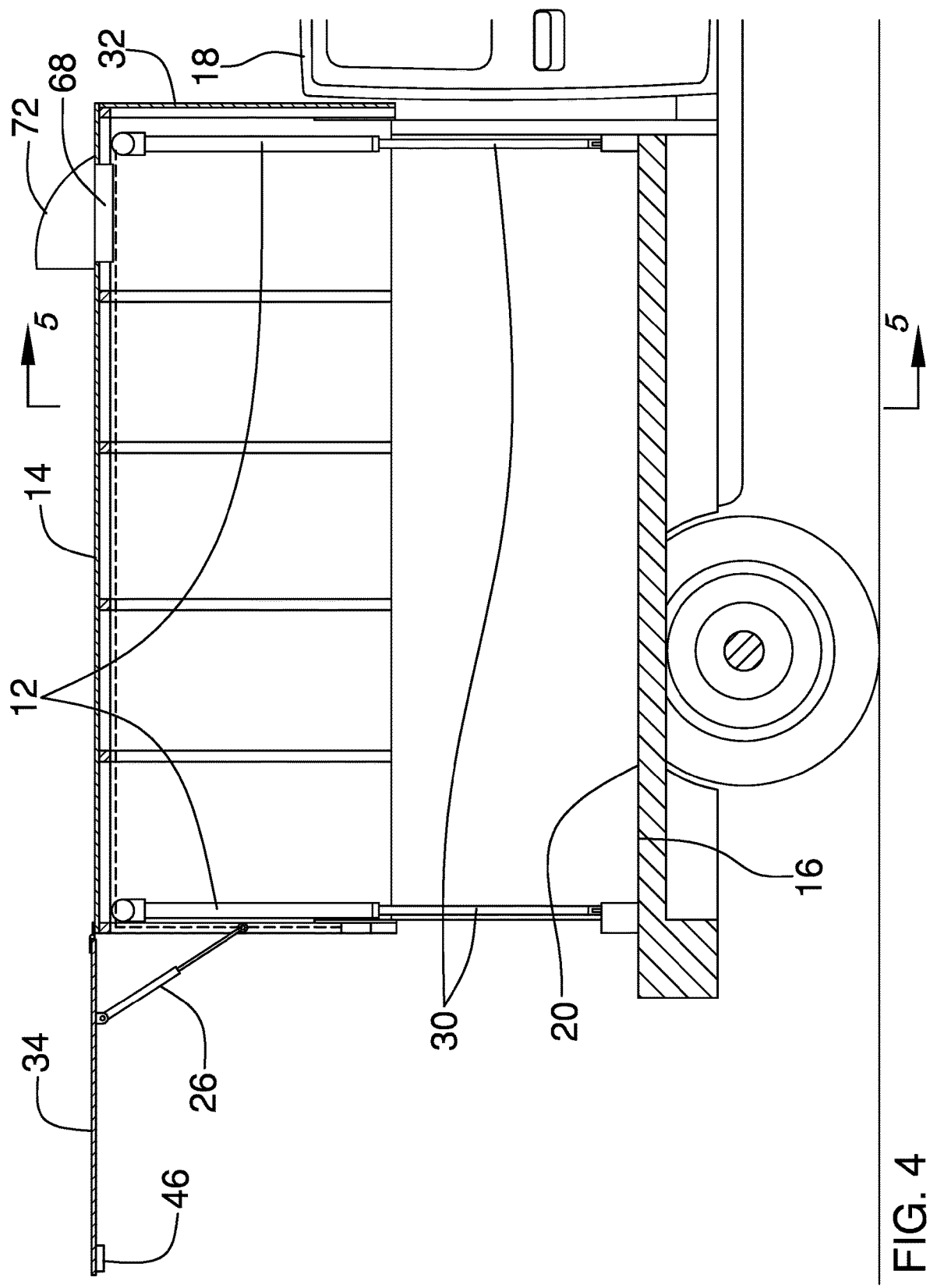
FIG. 4 is a side cross-sectional view of an embodiment of the disclosure.
Figure 5:
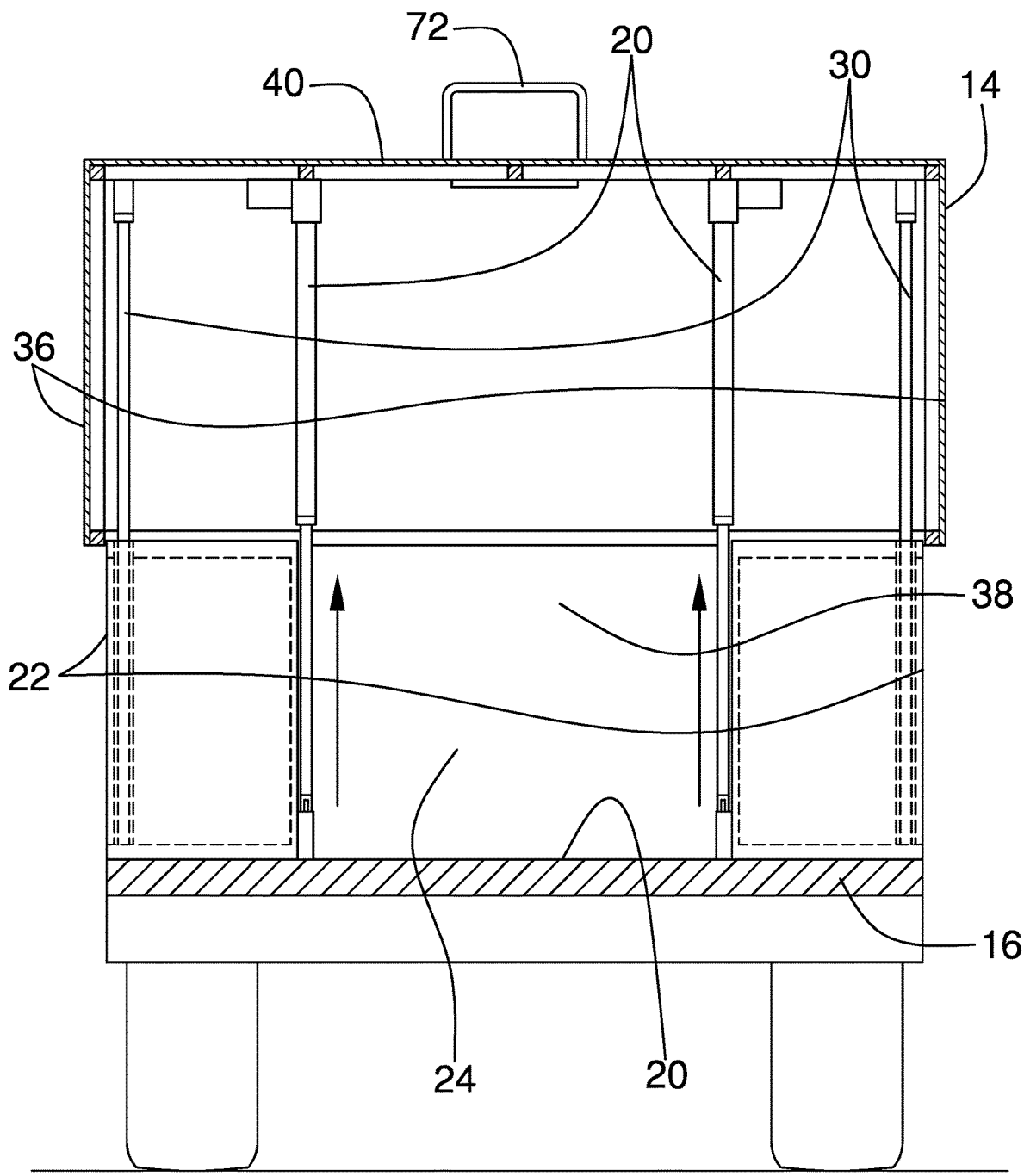
FIG. 5 is a front cross-sectional view of an embodiment of the disclosure.
Figure 8:
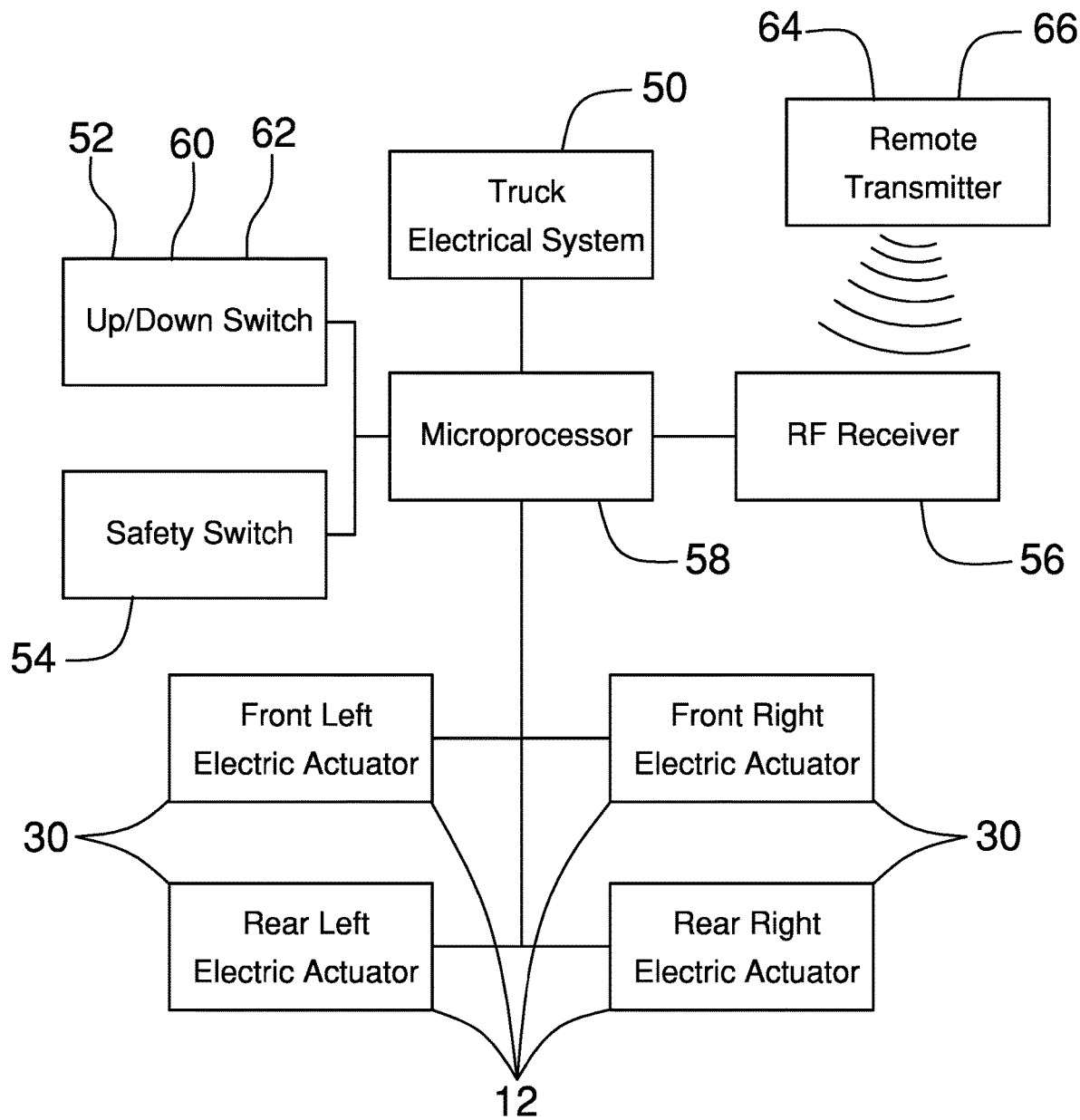
FIG. 8 is a block diagram of an embodiment of the disclosure.

The lift module 12 comprises a plurality of linear actuators 30. Such linear actuators 30 are known to those skilled in the art of linear actuating devices and may include hydraulic cylinders, worm gears, screw gears, or the like. As shown in FIGS. 4, 5, and 8, four linear actuators 30 are positioned two apiece proximate to a front panel 32 and a rear panel 34 of the shell 14.

The shell 14, which may be substantially cuboid, domed, or the like, is attached to the lift module 12 so that the shell 14 is selectively positionable in an extended configuration, as shown in FIG. 2, and a lowered configuration, as shown in FIG. 1. For purpose of this disclosure, cuboid is defined as including rectangular shapes having well defined angular relationships between the various panels. In the extended configuration, the pair of sidewalls 22 and the central pathway 24 are accessible to the user. In the lowered configuration, opposed side panels 36 of the shell 14 bracket and at least partially cover the sidewalls 22 of the bed 16 and the rear panel 34 of the shell 14 covers an opening 38 to the central pathway 24. The shell 14 thus is configured to deter access to the sidewalls 22 and to the central pathway 24. The present invention anticipates the lift module 12 extending the shell 14 high enough to allow the user to work comfortably in the central pathway 24.

As shown in FIGS. 2-4, the rear panel 34 is hingedly attached to a top panel 40 of the shell 14. The rear panel 34 is configured to be hinged relative to the top panel 40 to access the opening 38 to the central pathway 24. The present invention also anticipates the rear panel 34 being hingedly attached to a respective opposed side panel 36 as well as a pair of rear panels 34, with each rear panel 34 being hingedly attached to a respective opposed side panel 36.

A lift assist 42 is hingedly attached to and extends between the rear panel 34 and at least one opposed side panel 36 of the shell 14. The lift assist 42 biases the rear panel 34 to an open configuration, thereby facilitating opening 38 of the rear panel 34 and retention of the rear panel 34 in the open configuration. As shown in FIG. 4, the lift assist 42 comprises a pair of gas springs 44, with each gas spring 44 being hingedly attached to and extending between the rear panel 34 a respective opposed side panel 36 of the shell 14.

A lock 46 is attached to the rear panel 34 and is configured to selectively engage the bed 16 of the truck 18 so that the shell 14 is selectively lockable in the lowered configuration. The lock 46 may comprise any locking means known to those skilled in the art of locks, such as, but not limited to, cam locks, magnetic locks, or the like.

The truck bed enclosure assembly 10 also comprises a controller 48, which is configured to be mountable to the bed 16 of the truck 18 and to electrically engage an electrical circuit 50 of the truck 18. The controller 48 is operationally engaged to the lift module 12 and thus is configured to be manipulated by the user to selectively raise and lower the shell 14. As shown in FIGS. 1 and 2, the controller 48 is substantially inaccessible when the rear panel 34 is in the closed configuration, thereby deterring unauthorized access to the controller 48.

Figure 6:
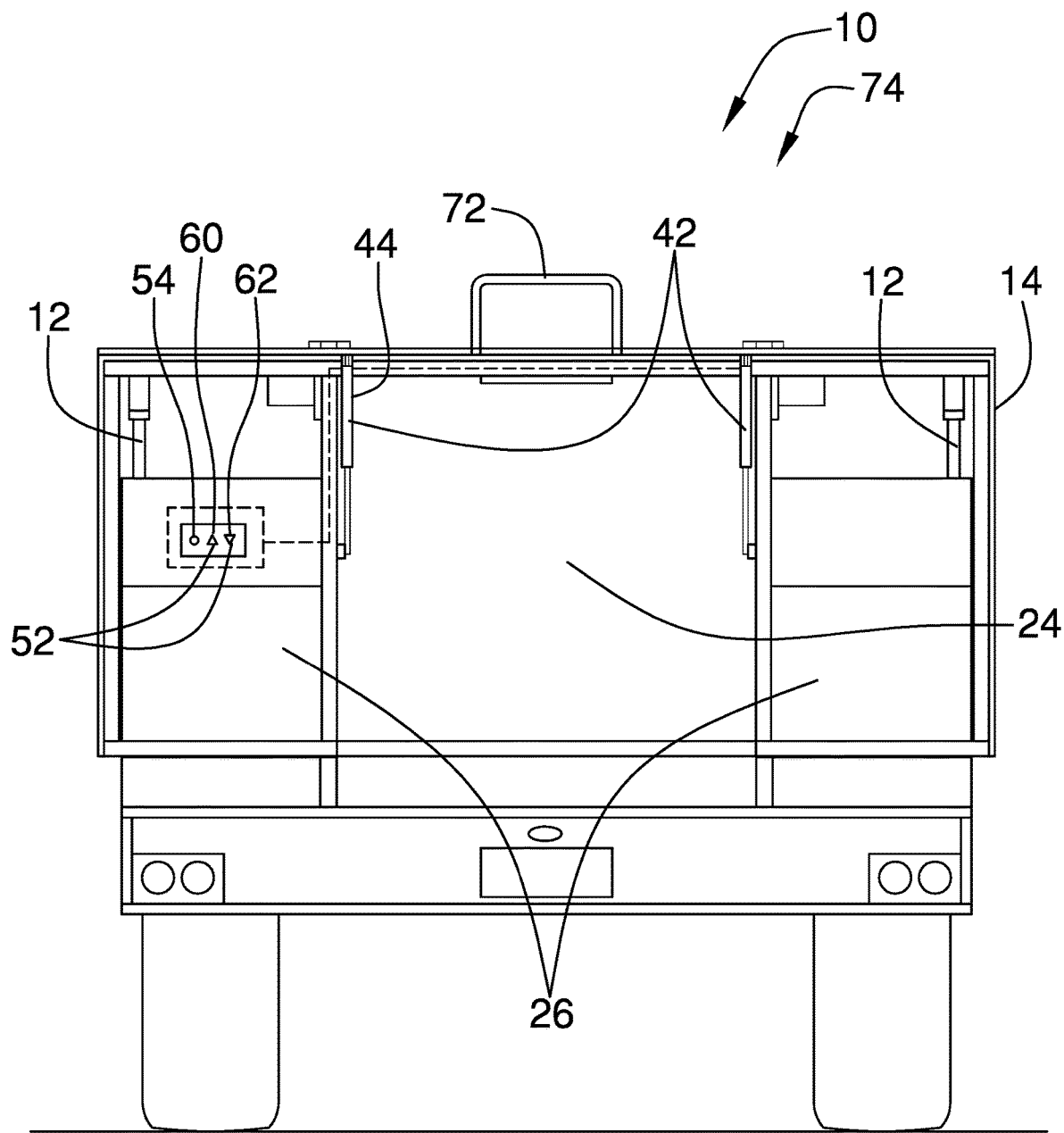
FIG. 6 is a rear lowered view of an embodiment of the disclosure.
Figure 7:
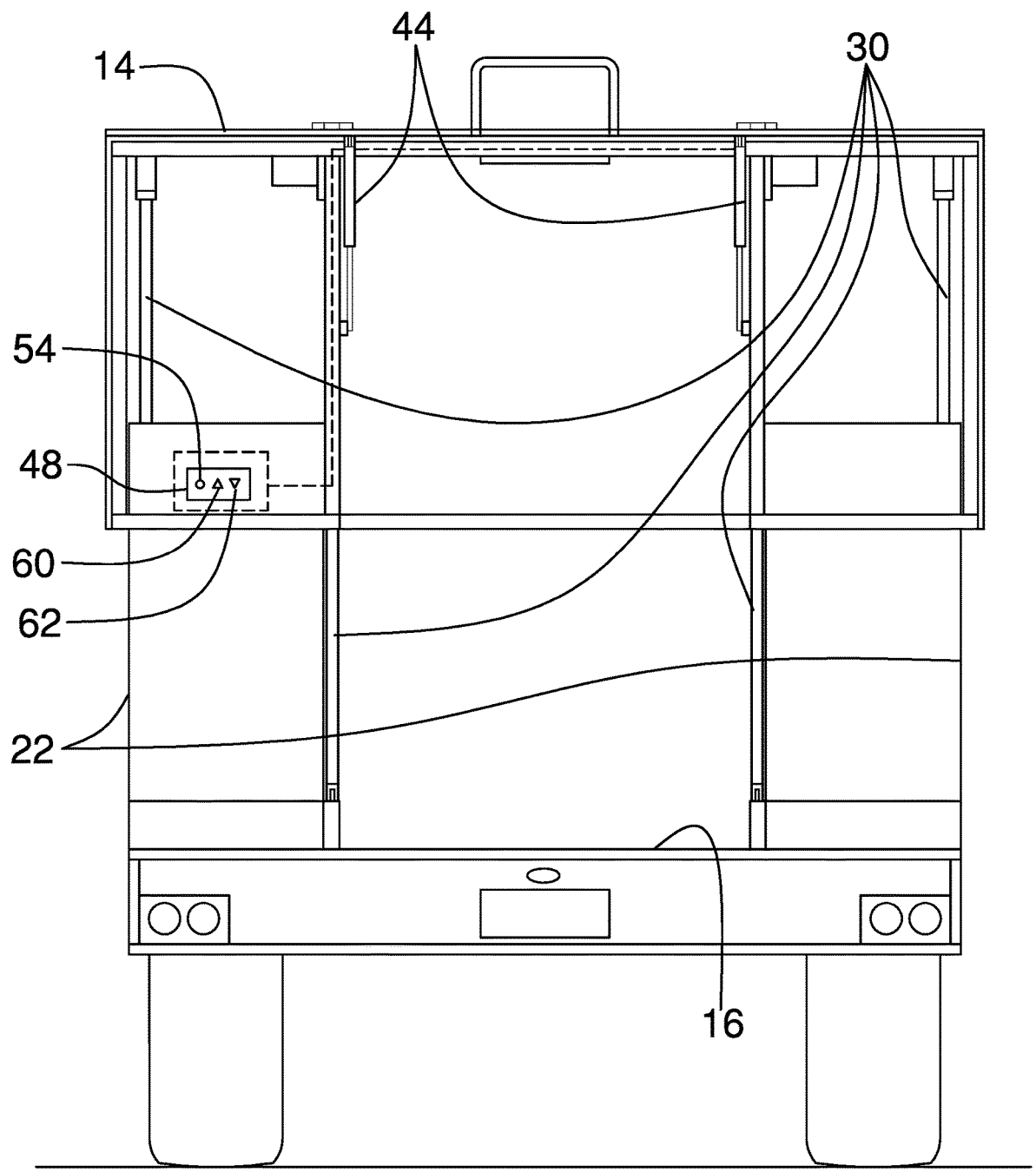
FIG. 7 is a rear extended view of an embodiment of the disclosure.

The controller 48 may comprise a lift switch 52, a lockout switch 54, and a receiver 56, which are operationally engaged to a microprocessor 58. The lift switch 52 is configured to be switched to selectively lower and raise the shell 14. As shown in FIG. 6, the lift switch 52 comprises an Up button 60 and a Down button 62. The present invention anticipates the lift switch 52 comprising other switching means, such as, but not limited to, toggles, slides, and the like. The lockout switch 54 is configured to be switched to prevent inadvertent switching of the lift switch 52, thereby reducing risk to the user. The present invention also anticipates the controller 48 comprising an electronic display panel.

The truck bed enclosure assembly 10 also may comprise a remote control 64, which comprises a transmitter 66. The remote control 64 is configured to be manipulated by the user to communicate commands to the controller 48 to selectively actuate the lockout switch 54 and to selectively raise and lower the shell 14.

As shown in FIG. 4, an aperture 68 is positioned in the shell 14 to vent an interior space 70 that is defined by the shell 14 and the bed 16 of the truck 18. The aperture 68 is positioned in the top panel 40. A scoop 72 is attached to the top panel 40 and is positioned between the aperture 68 and the front panel 32 of the shell 14. The scoop 72 is configured to direct air away from the aperture 68 as the truck 18 is driven.

The present invention also anticipates a truck bed enclosure system 74, which comprises a truck 18 and a truck bed enclosure assembly 10. A bed 16 of the truck 18 comprises a platform 20 and a pair of sidewalls 22, which define a central pathway 24. At least one of the sidewalls 22 comprises a plurality of cabinets 26. As shown in FIGS. 2 and 3, each sidewall 22 comprises a plurality of cabinets 26. Each cabinet 26 has a door 28, which is configured to allow access to the cabinet 26 by a user who is standing next to the bed 16 of the truck 18. Such setups are commonly used by tradespeople, such as plumbers, electricians, vehicle repairman, and the like.

A lift module 12 of the truck bed enclosure assembly 10 is mounted to the bed 16 of the truck 18. A shell 14 of the truck bed enclosure assembly 10 is attached to the lift module 12 so that the shell 14 is selectively positionable in an extended configuration and a lowered configuration. In the extended configuration, the cabinets 26 and the central pathway 24 are accessible to the user. In the lowered configuration, opposed side panels 36 of the shell 14 bracket and at least partially cover the doors 28. A rear panel 34 of the shell 14 covers the opening 38 to the central pathway 24. The shell 14 thus deters access to the cabinets 26 and the central pathway 24.

In use, the controller 48 is used to position the shell 14 in the lowered configuration to secure contents of the cabinets 26 and of the bed 16 of the truck 18. In the lowered configuration, the shell 14 does not significantly increase drag while driving the truck 18. Upon reaching a work location, the user can use the controller 48 to raise the shell 14, thereby exposing the doors 28 of the cabinets 26 and giving the user access to their contents. The rear panel 34 can be hinged open to access the central pathway 24 and contents positioned in the bed 16 of the truck 18 or upon the cabinets 26. Additionally, the present invention anticipates some doors 28 of cabinets 26 hinging open into the interior space 70 with contents of the cabinets 26 being accessible to the user from the central pathway 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A truck bed enclosure assembly comprising:
   a lift module configured to be mountable to a bed of a truck, the bed comprising a platform and a pair of sidewalls, which define a central pathway; and
   a shell attached to the lift module, such that the shell is selectively positionable in an extended configuration, wherein the pair of sidewalls and the central pathway are accessible to a user, and a lowered configuration, wherein opposed side panels of the shell bracket and extend below an uppermost edge of the sidewalls of the bed and at least partially cover outwardly facing surfaces of the sidewalls of the bed and wherein a rear panel of the shell covers an opening to the central pathway, wherein the shell is configured for deterring access to the sidewalls and to the central pathway.

2. The truck bed enclosure assembly of claim 1, wherein the lift module comprises a plurality of linear actuators.

3. The truck bed enclosure assembly of claim 1, wherein the shell is substantially cuboid.

4. The truck bed enclosure assembly of claim 1, further including the rear panel being hingedly attached to a top panel of the shell, wherein the rear panel is configured for being hinged relative to the top panel for accessing the opening to the central pathway.

5. The truck bed enclosure assembly of claim 4, further including a lift assist hingedly attached to and extending between the rear panel and at least one opposed side panel of the shell, such that the lift assist biases the rear panel to an open configuration.

6. The truck bed enclosure assembly of claim 5, wherein the lift assist comprises a pair of gas springs, each gas spring being hingedly attached to and extending between the rear panel a respective opposed side panel of the shell.

7. The truck bed enclosure assembly of claim 4, further including a lock attached to the rear panel and being configured to selectively engage the bed of the truck, such that the shell is selectively lockable in the lowered configuration.

8. The truck bed enclosure assembly of claim 4, further including a controller configured to be mountable to the bed of the truck and for electrically engaging an electrical circuit of the truck, the controller being operationally engaged to the lift module, wherein the controller is configured for being manipulated by the user for selectively raising and lowering the shell.

9. The truck bed enclosure assembly of claim 8, wherein the controller is substantially inaccessible when the rear panel is in the closed configuration.

10. The truck bed enclosure assembly of claim 8, wherein the controller comprises:
    a microprocessor;
    a lift switch operationally engaged to the microprocessor, wherein the lift switch is configured for being switched for selectively lowering and raising the shell; and
    a lockout switch operationally engaged to the microprocessor, wherein the lockout switch is configured for being switched for preventing inadvertent switching of the lift switch.

11. The truck bed enclosure assembly of claim 10, wherein the lift switch comprises an Up button and a Down button.

12. The truck bed enclosure assembly of claim 10, further including:
    the controller comprising a receiver operationally engaged to the microprocessor;
    a remote control comprising a transmitter, wherein the remote control is configured for being manipulated by the user for communicating commands to the controller for selectively actuating the lockout switch and for selectively raising and lowering the shell.

13. The truck bed enclosure assembly of claim 1, further including an aperture positioned in the shell for venting an interior space defined by the shell and the bed of the truck, the aperture being positioned in a top panel of the shell.

14. The truck bed enclosure assembly of claim 13, further including a scoop attached to the top panel and being positioned between the aperture and a front panel of the shell, wherein the scoop is configured for directing air away from the aperture as the truck is being driven.

15. A truck bed enclosure assembly comprising:
    a lift module configured to be mountable to a bed of a truck, the bed comprising a platform and a pair of sidewalls, which define a central pathway, the lift module comprising a plurality of linear actuators;
    a shell attached to the lift module, such that the shell is selectively positionable in an extended configuration, wherein the pair of sidewalls and the central pathway are accessible to a user, and a lowered configuration, wherein opposed side panels of the shell bracket and extend below an uppermost edge of the sidewalls of the bed and at least partially cover outwardly facing surfaces of the sidewalls of the bed and wherein a rear panel of the shell covers an opening to the central pathway, wherein the shell is configured for deterring access to the sidewalls and to the central pathway, the shell being substantially cuboid, the rear panel being hingedly attached to a top panel of the shell, wherein the rear panel is configured for being hinged relative to the top panel for accessing the opening to the central pathway;
    a lift assist hingedly attached to and extending between the rear panel and at least one opposed side panel of the shell, such that the lift assist biases the rear panel to an open configuration, the lift assist comprising a pair of gas springs, each gas spring being hingedly attached to and extending between the rear panel a respective opposed side panel of the shell;
    a lock attached to the rear panel and being configured to selectively engage the bed of the truck, such that the shell is selectively lockable in the lowered configuration,
    a controller configured to be mountable to the bed of the truck and for electrically engaging an electrical circuit of the truck, the controller being operationally engaged to the lift module, wherein the controller is configured for being manipulated by the user for selectively raising and lowering the shell, the controller being substantially inaccessible when the rear panel is in the closed configuration, the controller comprising:
        a microprocessor,
        a lift switch operationally engaged to the microprocessor, wherein the lift switch is configured for being switched for selectively lowering and raising the shell, the lift switch comprising an Up button and a Down button,
        a lockout switch operationally engaged to the microprocessor, wherein the lockout switch is configured for being switched for preventing inadvertent switching of the lift switch, and
a receiver operationally engaged to the microprocessor;
a remote control comprising a transmitter, wherein the remote control is configured for being manipulated by the user for communicating commands to the controller for selectively actuating the lockout switch and for selectively raising and lowering the shell;
an aperture positioned in the shell for venting an interior space defined by the shell and the bed of the truck, the aperture being positioned in the top panel; and
a scoop attached to the top panel and being positioned between the aperture and a front panel of the shell, wherein the scoop is configured for directing air away from the aperture as the truck is being driven.

16. A truck bed enclosure system comprising:
a truck, a bed of the truck comprising a platform and a pair of sidewalls, which define a central pathway, at least one of the sidewalls comprising a plurality of cabinets, each cabinet having a door configured for allowing access to the cabinet by a user standing next to the bed of the truck;
a lift module mounted to the bed of the truck; and
a shell attached to the lift module, such that the shell is selectively positionable in an extended configuration, wherein the cabinets and the central pathway are accessible to the user, and a lowered configuration, wherein opposed side panels of the shell bracket and extend below an uppermost edge of the sidewalls of the bed and at least partially cover outwardly facing surfaces of the doors and wherein a rear panel of the shell covers the opening to the central pathway, such that the shell deters access to the cabinets and the central pathway.

17. The truck bed enclosure system of claim 16, wherein each sidewall comprises a plurality of cabinets.

18. The truck bed enclosure system of claim 16, further including;
the rear panel being hingedly attached to a top panel of the shell, wherein the rear panel is configured for being hinged relative to the top panel for accessing the opening to the central pathway; and
a lift assist hingedly attached to and extending between the rear panel and at least one opposed side panel of the shell, such that the lift assist biases the rear panel to an open configuration.

19. The truck bed enclosure system of claim 18, wherein the lift module comprises a plurality of linear actuators.

20. The truck bed enclosure system of claim 16, further including;
a controller mounted to the bed of the truck and electrically engaged to an electrical circuit of the truck, the controller being operationally engaged to the lift module, wherein the controller is configured for being manipulated by the user for selectively raising and lowering the shell, the controller comprising:
a microprocessor,
a lift switch operationally engaged to the microprocessor, wherein the lift switch is configured for being switched for selectively lowering and raising the shell,
a lockout switch operationally engaged to the microprocessor, wherein the lockout switch is configured for being switched for preventing inadvertent switching of the lift switch, and
a receiver operationally engaged to the microprocessor; and
a remote control comprising a transmitter, wherein the remote control is configured for being manipulated by the user for communicating commands to the controller for selectively actuating the lockout switch and for selectively raising and lowering the shell.

\* \* \* \* \*